Nov. 13, 1951  L. E. ELLISON ET AL  2,574,551
ELECTRONIC TACHOMETER
Filed June 6, 1945  3 Sheets-Sheet 1
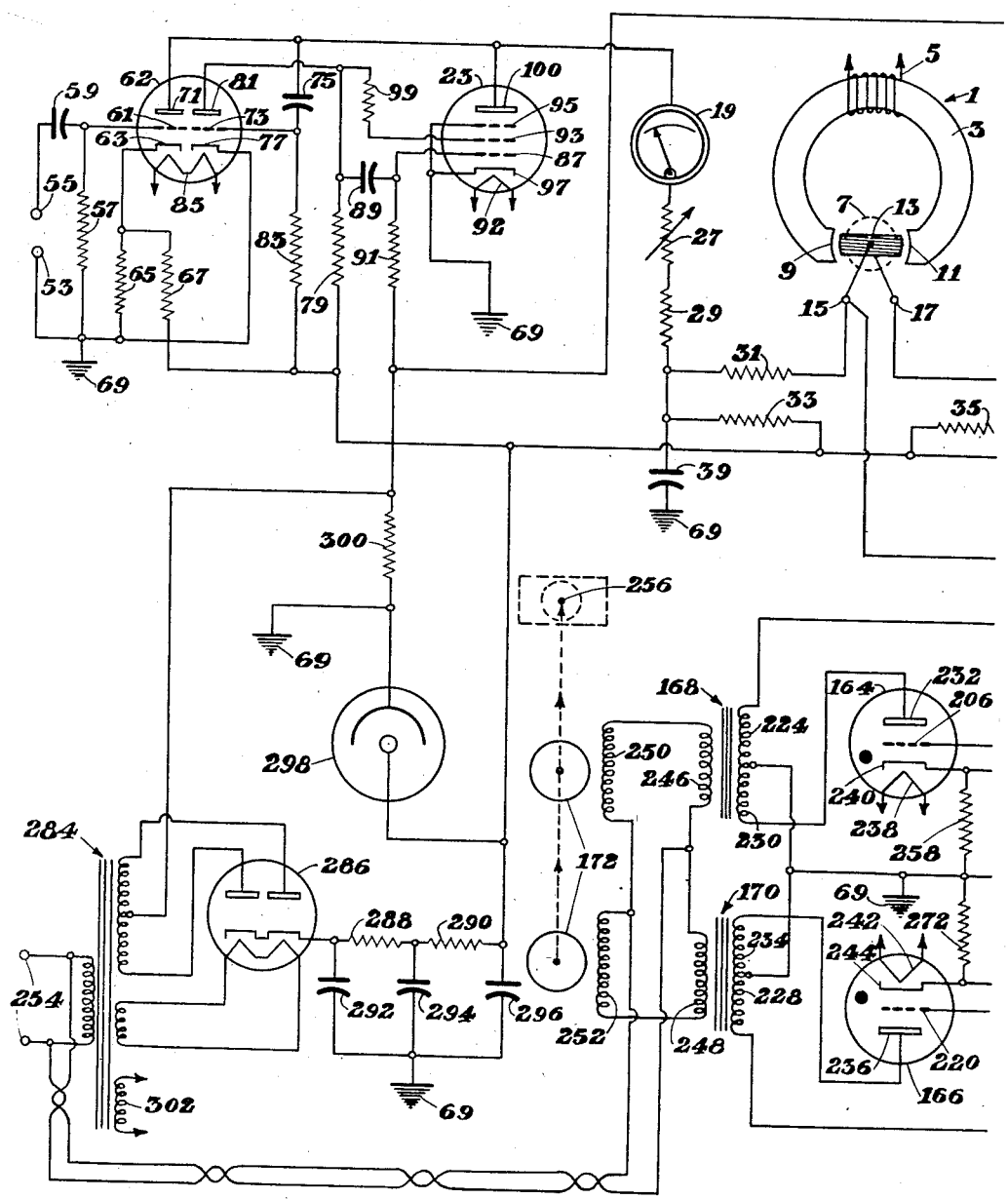
Fig.1-A
INVENTORS
Lynn E. Ellison
Ronald R. Proctor
BY
Edward H. Lang
ATTORNEY

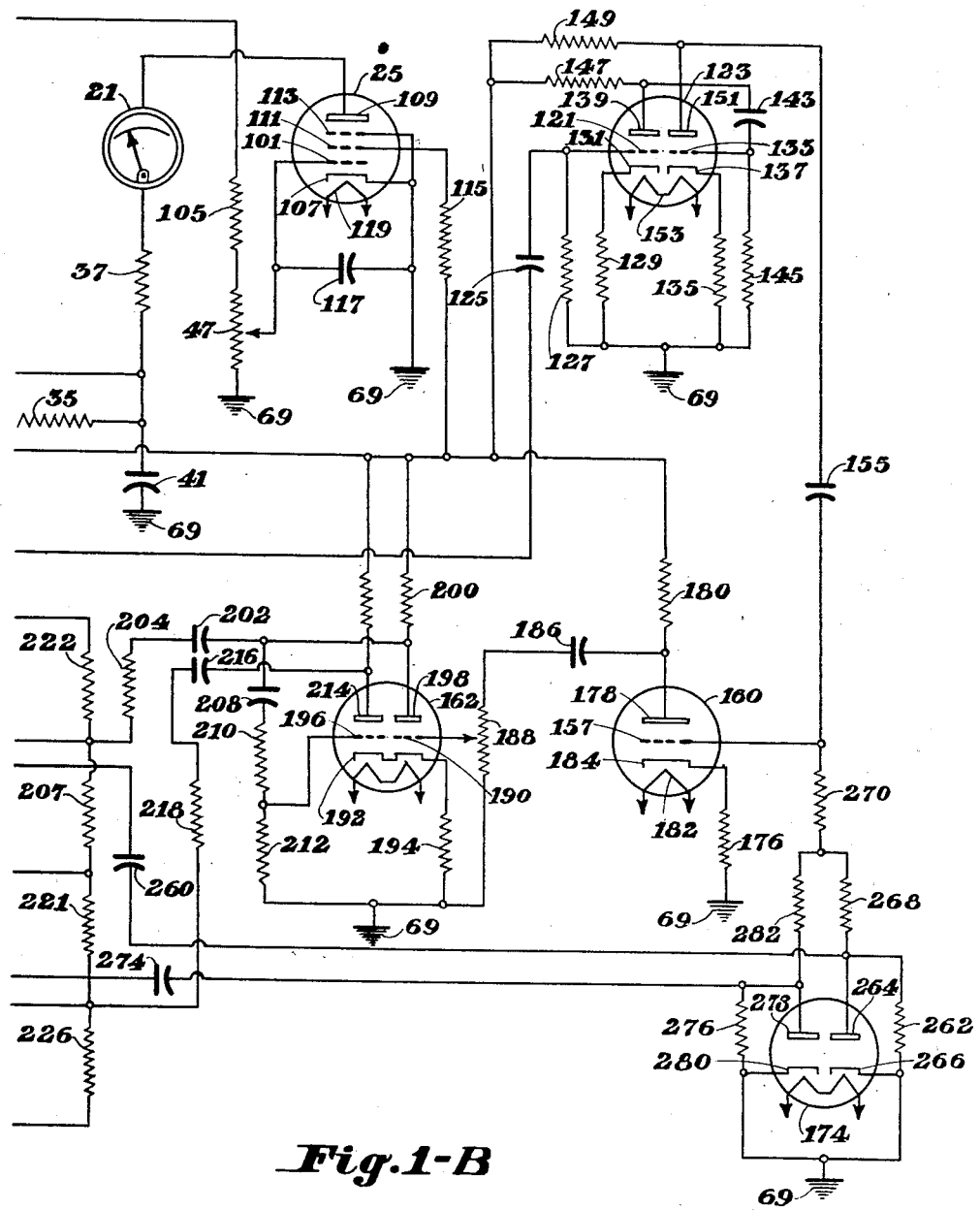
Fig.1-B

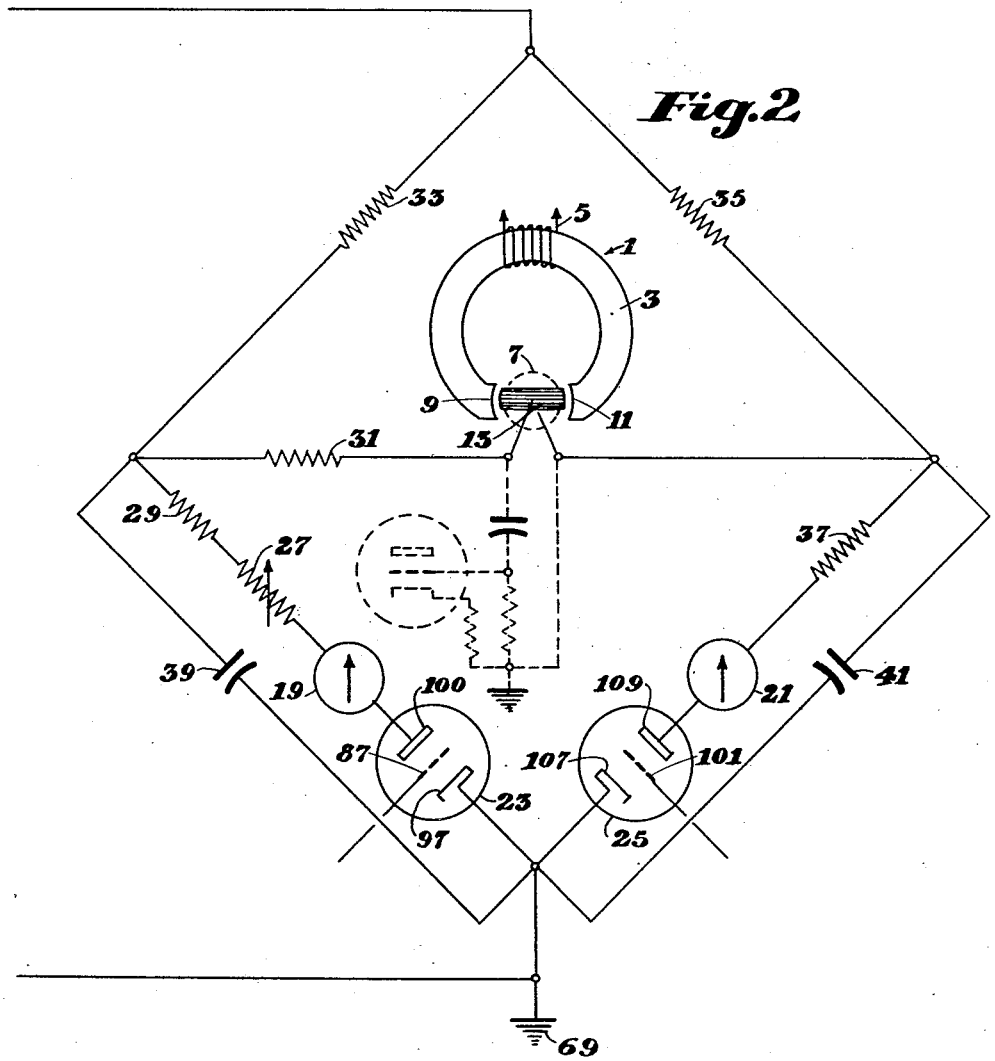

Patented Nov. 13, 1951

2,574,551

UNITED STATES PATENT OFFICE 2,574,551

ELECTRONIC TACHOMETER

Lynn E. Ellison and Ronald R. Proctor, Evanston, Ill., assignors to The Pure Oil Company, Chicago, Ill., a corporation of Ohio Application June 6, 1945, Serial No. 597,824

1 Claim. (Cl. 175—183)

This invention relates to a device or circuit for controlling the speed of engines and motors.

In our pending application Serial No. 592,418 filed May 7, 1945, now abandoned, there is described and claimed a control transformer and a circuit including a control transformer useful for regulating a condition which is capable of being transformed into electrical energy. The control transformer disclosed and claimed in the aforesaid application comprises a permanently magnetized annular core made of iron, or other magnetic material capable of being permanently magnetized, a primary winding on the core, a cylindrical iron core mounted between the poles of the permanent magnet in order to reduce the reluctance of the path of the magnetic flux in the gap between the poles, and an oscillatory coil of wire surrounding the cylindrical iron core, adapted to be held in zero position by means of hairsprings attached to the ends of the coil and to two stationary points, which coil is adapted to oscillate in the gap between the poles of the permanent magnet and the cylindrical iron core. The oscillatory coil is provided with terminals adapted to be connected to a source of direct current of a variable nature, and the terminals of the oscillatory coil are also adapted to be connected to an output circuit.

This invention is directed primarily to a device or circuit for integrating voltage pulsations from the primary of the ignition of an internal combustion engine and for translating these impulses into electrical energy which will accurately control the speed of the engine so that the motor will run at any selected speed up to its maximum speed regardless of the change of load between zero and maximum power output of the engine at the selected speed. The device is adapted for use in conjunction with the control of engines and motors other than ignition type combustion engines.

An object of the invention is to provide a device or circuit for controlling the speed of motors.

Another object of the invention is to control the speed of ignition type internal combustion engines.

Still another object of the invention is to provide a device or circuit for controlling the speed of engines or motors.

A further object of the invention is to provide a device or circuit for controlling the speed of ignition type internal combustion engines.

Further objects of the invention will become apparent from the following description and accompanying drawings, of which Figures 1a and 1b are a diagrammatic representation of a device or circuit in accordance with the invention; and Figure 2 is a simplified diagram of a portion of the circuit shown in Figure 1. Figure 3 is a block diagram outlining stages in taking a signal from the motor and converting it to a control signal for the same motor.

Referring to the drawing numeral 1 indicates generally a control transformer comprising a permanently magnetized annular iron core 3 having a primary winding 5 connected to a source of alternating current, a cylindrical iron core 7 mounted between the poles 9 and 11 of the annular core 3, and a coil of wire 13 comprised of many turns surrounding the core 7. The coil 13 preferably is mounted on pivots so that it may oscillate a maximum of 45° in either direction from its horizontal or neutral position. The coil is insulated from the mounting. The ends of the coil 13 are connected to fixed terminals 15 and 17 by means of hairsprings which also serve to hold the coil 13 in its horizontal or zero position, i. e. in a position in which the plane of the coil is parallel to the magnetic lines of force between the poles when no direct current is passing through the coil.

When direct current flows through the coil 13 it will rotate in its pivots in one direction or the other, depending upon the direction of flow of the direct current passing therethrough. The magnitude of the movement is dependent on the magnitude of the current passing therethrough, higher voltages or currents causing the coil to rotate to a greater extent as in any permanent magnet type indicating meter well known to the art.

When the coil 13 is in its horizontal or zero position no alternating current will flow therethrough because the alternating current induced in the wires on the left side of the coil is exactly equal and opposite to that induced in the wires on the right side of the coil. However, when the coil deviates from its horizontal or zero position alternating current is induced in the coil 13, and the greater the angle of rotation the greater the A. C. voltage induced therein. When the coil is turned 45° in one direction the induced voltage is 180° out of phase with the voltage induced when the coil is turned in the opposite direction to 45°. The amplitude of output voltage from coil 13 in any position between 0° and 45° from the horizontal is sinusoidally proportional to the degrees of rotation from the zero or horizontal position.

The control transformer 1 is connected into a Wheatstone-type bridge circuit, more clearly shown in Figure 2, comprising the meters 19 and 21, vacuum tubes 23 and 25, calibrating potentiometer 27, resistors 29, 31, 33, 35 and 37 and condensers 39 and 41. The meters 19 and 21 are milliammeters calibrated in R. P. M. (revolutions per minute) and are connected in the anode circuits of vacuum tubes 23 and 25, respectively. Meter 21 is set to read the desired speed by manual adjustment of the potentiometer 47 (Figure 1).

The actual speed of the engine is indicated by the milliammeter 19. When the voltage drops across resistors 33 and 35 are equal there will be no potential difference across the terminals of the oscillatory coil 13 of the control transformer, and the coil 13 will then be held in its neutral or zero position by the hairsprings previously described. As long as coil 13 is held in its neutral or zero position no alternating current will be induced therein from the primary winding 5. However, if the speed of the engine exceeds or falls below the speed at which the bridge circuit is balanced, the circuit will become unbalanced causing a direct current potential across coil 13. Coil 13 will thereupon rotate in one direction or the other depending on whether the motor is running slower or faster than the set speed, and this will cause an alternating current to be induced therein.

Referring now to Figure 1, the voltage variations across the ignition points of the engine primary ignition system are impressed across resistor 57 from the terminals 53 and 55 and through isolating condenser 59, said voltages appearing on the grid 61 of a dual type vacuum tube 62. These voltage variations cause differences of potential between the grid 61 and cathode 63 of the vacuum tube 62. The cathode 63 is maintained at a fixed voltage above ground potential by means of voltage divider resistors 65 and 67 which are connected between a source of high voltage direct current to be later described, and ground 69.

The anode 71 of vacuum tube 62 is supplied with high voltage direct current from the same source just referred to through meter 19, potentiometer 27, resistor 29 and resistor 33. Hence, any voltage variations between grid 61 and cathode 63 cause variations in the current through anode 71, producing an amplification of the input voltage. This amplified voltage is impressed on grid 73 of vacuum tube 62 through condenser 75 and across resistor 83, and the voltage difference between grid 73 and cathode 77, which is grounded at 69, is further amplified such that the voltage drop appearing across resistor 79 due to changes of current flowing between anode 81 and cathode 77 represents a greatly amplified version of the original input voltage from the engine ignition primary.

The grid 73 is biased through resistor 83 which returns to the high voltage source previously referred to. The ratio between the capacitance of condenser 75 and the resistance of resistor 83 determines the range over which this tachometer circuit will produce full scale deflection of meter 19. The product RC (resistance x capacitance) is the time constant upon which the range of the meter 19 previously referred to is determined, and must be less than the time between ignition impulses at the highest speed which is to be measured.

The vacuum tube 62 is provided with a heating filament 85 for heating the cathodes 63 and 77.

The amplified voltage from vacuum tube 62 is impressed on grid 87 of vacuum tube 23 through condenser 89 and across resistor 91. Bias voltage for grid 87 is obtained from the voltage drop across resistor 91. Heater 92 is provided for heating the cathode 97.

Grid 93 is a screen grid and grid 95 is a shield grid. Grid 95 is connected to cathode 97 which is at ground potential 69. Screen grid 93 is supplied with voltage through resistor 99. Tube 23 is provided with anode 100. The difference in voltage at any time between grid 87 and cathode 97 of vacuum tube 23 determines the amount of current which will flow in the anode circuit and hence through meter 19, potentiometer 27, resistor 29 and resistor 33. As the pulsations from the ignition primary increase in rate the vacuum tube 23 thus draws more current and the meter 19 will indicate a higher reading in R. P. M. When the speed of the engine drops the rate of pulsation becomes less, vacuum tube 23 passes less current and the meter 19 indicates a lower reading of R. P. M. By proper calibration of the meter 19 the exact speed of the engine can be read from the meter. The circuit just described constitutes an electronic tachometer capable of registering the speed of an ignition type internal combustion engine.

The relationship between current flow and indicated speed is practically linear in the electronic tachometer circuit with respect to the range of speeds ordinarily encountered in automotive engines. The potentiometer 27 is a calibrating potentiometer used to set the meter 19 so that the readings match the actual speed of the engine. The voltage drop across the resistor 33 is a function of the engine speed.

As previously pointed out the resistors 33 and 35 form two arms of a Wheatstone-type bridge circuit. The voltage across the resistor 35 required to balance the voltage across resistor 33 is obtained from the same source of high voltage direct current previously referred to, and is regulated or adjusted by vacuum tube 25. The grid 101 of vacuum tube 25 is maintained at some definite voltage by utilizing a part of the voltage drop across the voltage divider consisting of potentiometer 47 and resistor 105. The difference in voltage between grid 101 and cathode 107 determines the amount of current which will flow in the anode circuit comprising anode 109, meter 21, resistor 37 and resistor 35. Grids 111 and 113 are a screen grid and shield grid, respectively, grid 111 being supplied with voltage through resistor 115. Grid 113 is connected to the cathode 107 and grounded at 69. Condenser 117 is a by-pass condenser connected between grid 101 and cathode 107 to prevent transient currents from affecting the reading of meter 21. Vacuum tube 25 is provided with a heater 119 for the purpose of heating cathode 107.

When the speed of the engine which is to be regulated exceeds or falls below the speed for which meter 21 is set, direct current will flow through the coil 13 causing the coil to rotate from its horizontal or neutral position. An alternating current potential is thereupon induced in the coil 13 and is applied to grid 121 of vacuum tube 123 through condenser 125 and across resistor 127. Vacuum tube 123 is similar to the tube 62 and serves to amplify in two stages the voltage fed thereto. The bias voltage for grid 121 is obtained from the voltage drop across resistor 129 between cathode 131 and ground 69. Bias voltage for grid 133 is obtained from the voltage drop across resistor 135 connected between cathode 137 and ground 69. The amplified voltage from the first stage of vacuum tube 123, consisting of cathode 131, grid 121 and anode 139, is applied to grid 133 of the second stage through condenser 143 and across resistor 145. Resistors 147 and 149 are plate load resistors for anodes 139 and 151, respectively, and are supplied from the high voltage direct current source previously referred to. The heater 153 is provided to heat the cathodes 131 and 137.

The amplified output of vacuum tube 123 is applied to any type of phase-sensitive control circuit, which in turn, through meters, Thyratrons, or any other devices, can position the throttle or control the load or voltage of the engine or motor being regulated.

One type of circuit which may be used in connection with the control of the throttle of an internal combustion engine is shown in the drawing, and comprises an amplifying tube 160, a phase inverter tube 162 and associated circuit, two Thyratrons 164 and 166, two saturable core reactors 168 and 170, a dual electric motor 172, and a stepping action anti-hunt circuit based upon vacuum tube 174.

Vacuum tube 160 provides one stage of amplification, its bias voltage being obtained across resistor 176, and potential for its anode 178 being supplied through resistor 180 from the high voltage direct current source previously referred to. Heater 182 is provided to heat cathode 184.

The output of vacuum tube 160 is applied through condenser 186 across potentiometer 188 to the grid 190 of vacuum tube 162. Cathode 192 is connected to ground 69 through resistor 194, which provides the bias voltage for both grids 190 and 196 of vacuum tube 162. The amplified signal voltage on anode 198 appearing across resistor 200 is applied through condenser 202 and resistor 204 to the grid 206 of Thyratron 164 across resistor 207. It is also applied through condenser 208 and resistor 210 to grid 196 of vacuum tube 162. This voltage appearing across resistor 212 is amplified in the triode section consisting of cathode 192, grid 196 and anode 214 of vacuum tube 162, and is applied through condenser 216 and resistor 218 to grid 220 of Thyratron 166 across resistor 221, 180° out of phase with the voltage applied to grid 206 of Thyratron 164. Bias voltage for the grid 206 of Thyratron 164 is obtained through resistor 222 from winding 224 on the saturable core reactor 168. Bias voltage for the grid 220 of Thyratron 166 is obtained through resistor 226 from winding 228 of saturable core reactor 170. Winding 230 on reactor 168 supplies anode potential for the plate 232 of Thyratron 164. Winding 234 on reactor 170 supplies anode potential for the plate 236 of Thyratron 166.

Heater 238 supplies heat to the cathode 240 of Thyratron 164. Heater 242 supplies heat for the cathode 244 of Thyratron 166.

The anode potentials for both Thyratrons 164 and 166 are induced by transformer action in reactors 168 and 170, respectively, by connecting primaries 246 and 248 to a source of alternating current in series with the two field windings 250 and 252 of the control motor 172.

When the voltage from the control transformer 1 is in phase with the alternating current power supply 254, one Thyratron, as for example 164, will rectify and pass current as its grid 206 becomes more positive than its cathode 240. Direct current will thus flow in winding 230 of reactor 168, lowering the impedance of winding 246 of the reactor 168 and allowing alternating current to flow through winding 246 and through motor field winding 250. The motor 172 will thus be caused to turn in one direction and position the butterfly valve 256 of the engine so that the engine speed will change to match the set speed indicated on meter 21.

If secondary 13 of control transformer 1 is rotated in the opposite direction, the phase of the current induced therein will be 180° out of phase with the power supply 254. Thyratron 166 will thereupon rectify and pass current causing current flow in winding 234 of reactor 170 and reducing the impedance of winding 248 of this reactor so that current will flow in winding 248 and in motor field winding 252 causing the control motor 172 to rotate in the opposite direction and position the butterfly valve 256 in the opposite direction from which it was positioned when Thyratron 164 fired.

Because of the tendency of motor 172 to overshoot the balance point, an anti-hunt circuit is incorporated based upon vacuum tube 174. As the voltage on the grid 206 of Thyratron 164 increases in amplitude the voltage drop across resistor 258 increases. The pulse of voltage appearing across this resistor charges condenser 260, causing a pulse of voltage 90° out of phase with the voltage across resistor 258 to be applied across resistor 262. If the pulse appearing across resistor 262 is of less amplitude than the voltage between anode 264 and cathode 266 of vacuum tube 174, caused by the incoming signal which is in this case large, the motor 172 runs at full speed. If the pulse appearing across resistor 262 is greater than the voltage between anode 264 and cathode 266, due to a small signal signifying approaching balance, rectification occurs in this section of vacuum tube 174 and current flows through resistor 268. The voltage drop across resistor 270 caused by this current flow changes the bias voltage on the grid of vacuum tube 160, thereby reducing its sensitivity such that it causes the Thyratron 164 to stop passing current slightly sooner than it should to bring the control motor 172 to exact balance. The motor 172 will coast slightly and may or may not bring the butterfly valve 256 or other controlling device to the exact balance point. If it does not, the voltage will still continue to be induced in secondary 13 of control transformer 1 and as the condenser 260 discharges through resistor 262 to ground 69, vacuum tube 160 regains its sensitivity and causes Thyratron 164 to again pass current. The rate of such pulsation or stepping action is determined by the ratio of the capacitance of condenser 260 to the resistance of resistor 262 and is normally adjusted to give about one pulse per second.

When the control motor 172 is running in the opposite direction, it will run uninterruptedly until it approaches the balance point, at which time stepping action will occur by virtue of the increase in the ratio of voltage on the grid 220 of Thyratron 166, across resistor 272, to the signal voltage drop across resistor 276. The pulse of voltage appearing across resistor 272 charges condenser 274 causing a pulse of voltage 90° out of phase with the voltage across resistor 272 to be applied across resistor 276. If the pulse appearing across resistor 276 is of less amplitude than the voltage between anode 278 and cathode 280 of vacuum tube 174, the motor 172 will run uninterruptedly toward balance. If the pulse appearing across resistor 276 is greater than the voltage between anode 278 and cathode 280, rectification occurs in this section of vacuum tube 174 and current flows through resistor 282. The voltage drop across resistor 270 caused by this current flow changes the bias voltage on the grid of vacuum tube 160, thereby reducing its sensitivity such that it causes the Thyratron 166 to stop passing current slightly sooner than it should to bring the control motor 172 to exact balance. The motor 172 will coast slightly and may or may not bring the butterfly valve 256 or other controlling device to the exact balance point. If it does not, the voltage will still continue to be induced in secondary 13 of control transformer 1 and as the condenser 274 discharges through resistor 276 to ground 69, vacuum tube 160 regains its sensitivity and causes Thyratron 166 to again pass current. The rate of such pulsation or stepping action is determined by the ratio of the capacitance of condenser 274 to the resistance of resistor 276 and is normally adjusted to give about one pulse per second.

Anode voltage for the entire circuit is supplied by means of transformer 284, full wave rectifier vacuum tube 286 and a filter network consisting of resistors 288 and 290, and condensers 292, 294, and 296. The output voltage from this network is held constant by means of voltage regulator 298. Bias voltage for grids of vacuum tubes 23 and 25 is obtained from the voltage drop across resistor 300. Filament winding 302 on transformer 284 supplies heater voltage for all vacuum tubes in the circuit and for the primary winding 5 of the control transformer 1.

It is claimed:

An electronic tachometer for measuring the speed of ignition type internal combustion engines comprising a dual triode tube, a pentode tube, an ammeter, a potentiometer, a condenser and a resistor, means for impressing pulsating voltage from the primary of the engine ignition system through said condenser and across said resistor, on one grid of said dual triode tube, means for maintaining both cathodes in said tube at fixed voltages with reference to ground potential, means for connecting the anode associated with said grid to a source of high voltage direct current, means for impressing voltage from said anode through a second condenser on a separate grid in said dual triode tube, a biasing resistor connecting said last-mentioned grid to the source of said high voltage direct current, means for connecting the anode associated with said separate grid to the control grid of a pentode tube through a third condenser and across a third resistor, a separate biasing resistor connecting the last-mentioned grid to the source of high voltage direct current, a screen grid and shield grid in said pentode tube said shield grid and the cathode in said pentode tube being connected together and to ground, means including a fifth resistor for connecting said screen grid to said source of high voltage direct current, an anode in said pentode tube, said ammeter and potentiometer being connected in the anode circuit.

LYNN E. ELLISON.
RONALD R. PROCTOR.

REFERENCES CITED

The following references are of record in the file of this patent:

UNITED STATES PATENTS

| Number | Name | Date |
| --- | --- | --- |
| 970,794 | Carlson | Sept. 20, 1910 |
| 2,026,421 | Fecker | Dec. 31, 1935 |
| 2,068,147 | Miller | Jan. 19, 1937 |
| 2,108,014 | Jones | Feb. 8, 1938 |
| 2,111,598 | Morrison | Mar. 27, 1938 |
| 2,260,933 | Cooper | Oct. 28, 1941 |